United States Patent [19]

Lew

[11] Patent Number: 5,184,518
[45] Date of Patent: Feb. 9, 1993

[54] METHOD FOR MEASURING MASS FLOW RATE

[76] Inventor: Hyok S. Lew, 7890 Oak St., Arvada, Colo. 80005

[21] Appl. No.: 648,121

[22] Filed: Jan. 30, 1991

Related U.S. Application Data

[63] Continuation-in-part of Ser. No. 643,420, Jan. 22, 1991.

[51] Int. Cl.⁵ ............................................... G01F 1/84
[52] U.S. Cl. ................................................. 73/861.38
[58] Field of Search ........................ 73/861.37, 861.38

[56] References Cited

U.S. PATENT DOCUMENTS 4,823,614 4/1989 Dahlin .............................. 73/861.38

Primary Examiner—Herbert Goldstein

[57] ABSTRACT

The mass flow rate of media moving through a conduit with two fixed extremities under a flexural vibration is determined as a function of ratio between two detected values of the flexural vibration of the conduit generated by a first motion detector detecting the flexural vibration of the conduit at a first section thereof respectively at two instants when detected value of the flexural vibration generated by a second motion detector detecting the flexural vibration of the conduit at a second section thereof vanishes and reaches a peak value, respectively.

5 Claims, 4 Drawing Sheets

METHOD FOR MEASURING MASS FLOW RATE

This application is a continuation-in-part to patent application Ser. No. 07/643,420 entitled "Method for Measuring Convective Inertia Force" filed on Jan. 22, 1991 and, consequently, the priority on the invention described and claimed in the present application is based on the above-identified parent application.

BACKGROUND OF THE INVENTION

One of the most popular methods for measuring the mass flow rate of media moving through a conduit is to generate a flexural vibration of the circuit in a symmetric mode about the midsection of the conduit, and measure the phase angle different in the flexural vibration between the two opposite halves of the conduit or measure the asymmetry in the flexural vibration about the mid-section of the conduit as a measure of the mass flow rate of the media. At the present time, this method of measuring the phase angle difference or measuring the asymmetry in the flexural vibration is being practiced with the embodiments of the conduits shown in FIGS. 13 through 17. The inventor of the present invention, Hyok S. Lew has invented a number of different embodiments of the mass flowmeter employing one or a pair of vibrating conduits, shown in FIGS. 1 through 6 and 8 through 11, which combinations having unique structural features require a unique method for analyzing the flexural vibration of the conduit in determining the mass flow rate of media moving therethrough.

BRIEF SUMMARY OF THE INVENTION

The primary object of the present invention is to provide a method for measuring the mass flow rate of media moving through one or a pair of conduits under a flexural vibration, wherein the mass flow rate is determined from a ratio between two values of the flexural vibration measured at a section of the conduit respectively at two instants when the flexural vibration at another section of the conduit reaches respectively the peak value and zero during at least one half cycle of the flexural vibration of the conduit.

Another object is to provide a method for measuring the mass flow rate of media, wherein the mass flow rate is determined as a function of ratio between the peak value of an additive combination of two values of the flexural vibration of the conduit respectively measured at two sections of the conduit and the peak value of a differential combination of the same two values of the flexural vibration of the conduit.

These and other objects of the present invention will become clear as the description of the present invention progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
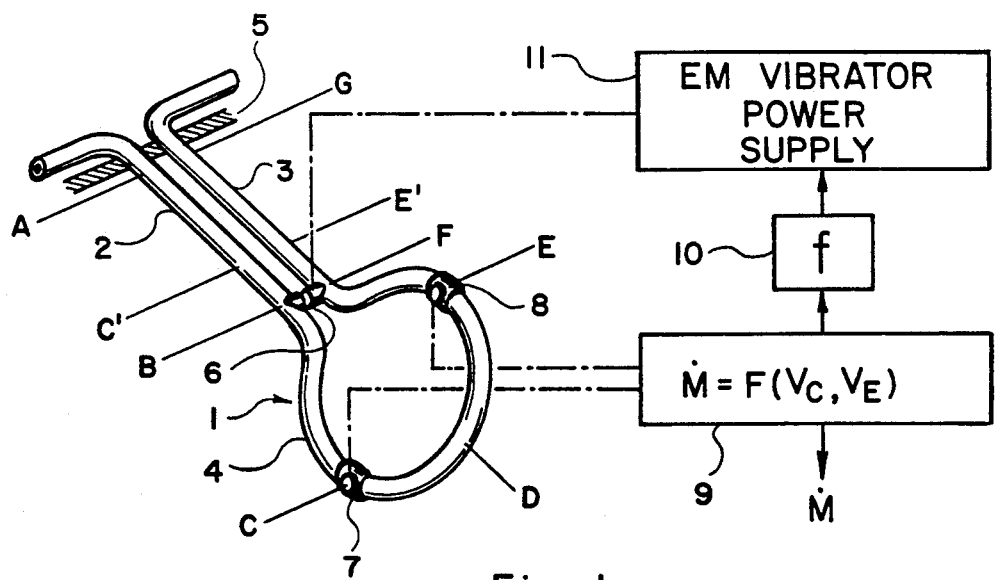
FIG. 1 illustrates a perspective view of an embodiment of the convective inertia force flowmeter employing a single conduit under flexural vibration of an antisymmetric mode about the midsection of the conduit.
Figure 2:
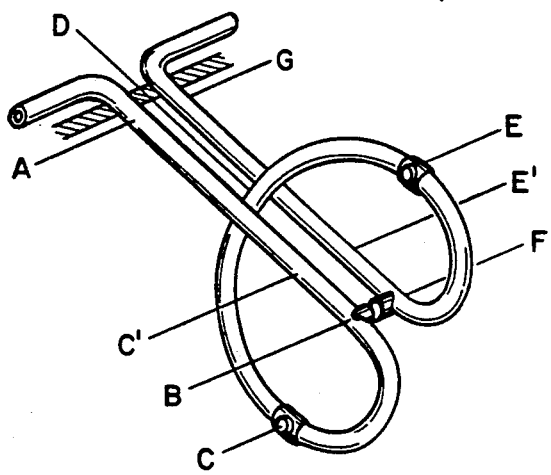
FIG. 2 illustrates another embodiment of the convective inertia force flowmeter employing a single conduit under flexural vibration of an antisymmetric mode about the midsection of the conduit.
Figure 3:
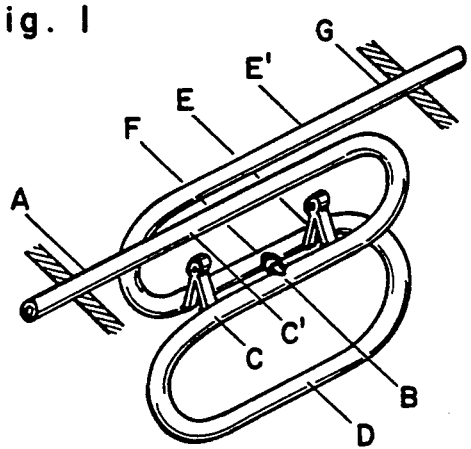
FIG. 3 illustrates a further embodiment of the convective inertia force flowmeter employing a single conduit under flexural vibration of an antisymmetric mode about the midsection of the conduit.
Figure 4:
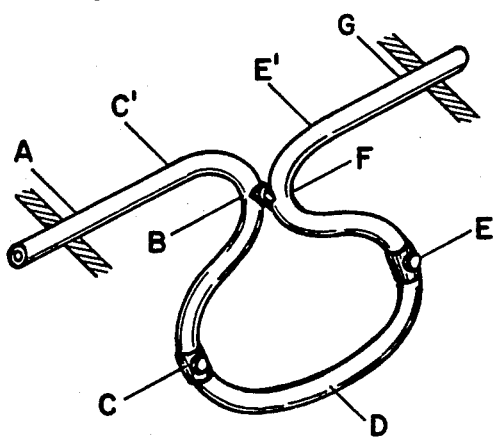
FIG. 4 illustrates yet another embodiment of the convective inertia force flowmeter employing a single conduit under flexural vibration of an antisymmetric mode about the midsection of the conduit.
Figure 5:
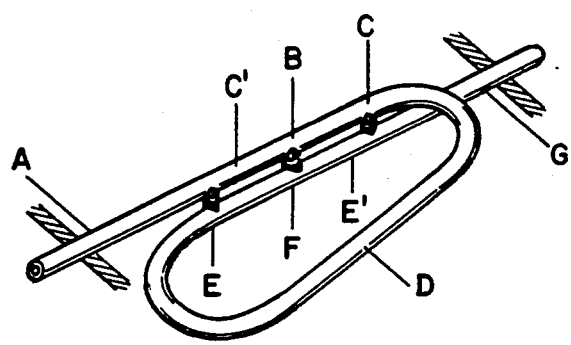
FIG. 5 illustrates yet a further embodiment of the convective inertia force flowmeter employing a single conduit under flexural vibration of an antisymmetric mode about the midsection of the conduit.
Figure 6:
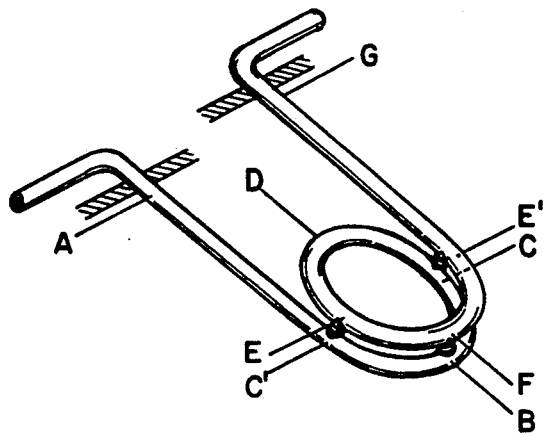
FIG. 6 illustrates still another embodiment of the convective inertia force flowmeter employing a single conduit under flexural vibration of an antisymmetric mode about the midsection of the conduit.

In FIG. 1 there is illustrates a perspective view of an embodiment of the convective inertia force flowmeter invented by Hyok S. Lew as an alternative to or as an improvement over the existing versions of the Coriolis force flowmeter shown in FIGS. 13 through 17, which comprises a single conduit 1 with two generally straight and parallel end sections 2 and 3 connected to one another by a looped midsection 4 substantially disposed on a plane generally perpendicular to the plane including the two generally straight end sections 2 and 3. The two extremities A and G of the conduit 1 are secured to a supporting structure 5. An electromagnetic vibrator 6 disposed at the over-hanging extremities B and F of the two end sections 2 and 3 vibrates the two opposite halves of the conduit 1 located on the two opposite sides of the midsection D relative to one another in directions generally perpendicular to the plane generally including the looped midsection 4 of the conduit 1. The motion sensors 7 and 8 measure the flexural vibration of the conduit 1 respectively at two sections C and E located symmetrically about the midsection D of the conduit 1. In an alternative design, the two motion sensors 7 and 8 may be relocated respectively to two sections C' and E' from the current positions C and E. It should be noticed that the two sections C and E are located respectively in the two opposite halves of a middle section of the conduit intermediate the two sections B and F whereat the electromagnetic vibrator 6 exerts the vibratory force generating the flexural vibration of the conduit, while the two sections C' and E' are located respectively intermediate the combination of the two sections B-F and the two extremities of A and G of the conduit. A data processor 9 determines the mass flow rate $\dot{M}$ of media moving through the conduit 1 by analyzing two flexural vibrations respectively measured by the motion sensors 7 and 8, which can be accelerometer type motion sensors shown in the particular illustrative embodiment, or other types readily available in the art of motion measurements. Another data processor 10 determines the natural frequency f of the flexural vibration of the conduit 1 from one or both flexural vibrations measured by the motion sensors 7 and/or 8, which information on the natural frequency f fed to the EM vibrator power supply 11 is used to energize the electromagnetic vibrator 6 with an AC current of frequency equal to the natural frequency f of the flexural vibration of the conduit 1. It should be understood that the electromagnetic vibrator 6 may continuously exert a vibratory force at the natural frequency f, or it may intermittently exert a mechanical force in pulses which produces resonance flexural vibration of the conduit 1 automatically at the natural frequency thereof.

In FIGS. 2, 3, 4, 5 and 6, there are illustrated other embodiments of the convective inertia force flowmeter invented by Hyok S. Lew, which employs a single conduit with the two opposite halves vibrated relative to one another by an electromagnetic vibrator and operates on the same principles as those described in conjunction with FIG. 1. In these embodiments, various alphabetical symbolisms representing different sections of the conduit stand for the same symbolisms as those explained in conjunction with FIG. 1.

Figure 7:
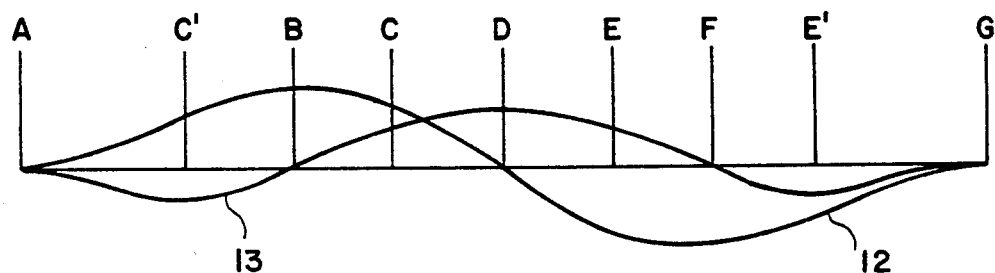
FIG. 7 illustrates distributions of the antisymmetric primary flexural vibration generated by an electromagnetic vibrator, and the symmetric secondary flexural vibration generated by media moving through the conduit as a dynamic reaction to the antisymmetric primary flexural vibration, which combination of the flexural vibrations takes place with the single conduit employed in the embodiments shown in FIGS. 1 through 6.

In FIG. 7 there is illustrated distributions of the antisymmetric primary flexural vibration generated by the electromagnetic vibrator, and the symmetric secondary flexural vibration generated by media moving through the conduit as a result of dynamic reaction between the antisymmetric primary flexural vibration of the conduit and the convective motion of the media, which distributions of the flexural vibrations are plotted following the length of the conduit now represented by a straight line between A and G representing the two secured extremities of the conduit employed in the embodiments shown in FIGS. 1 through 6, wherein the designations of the other sections stand for the same symbolisms as those described in conjunction with FIG. 1. It is readily recognized that the electromagnetic vibrator exerting a vibratory force at the two sections B and F respectively in two opposite directions generates the antisymmetric primary flexural vibration with distribution given by the curve 12, while it is not quite clear why such an antisymmetric primary flexural vibration interacts with the media moving through the conduit and generates the symmetric secondary flexural vibration with distribution given by the curve 13.

The equation of motion governing the flexural vibration of the conduit containing media moving therethrough can be written in the form $$\frac{\partial^4 y}{\partial x^4} + \frac{m + \rho A}{EI} \frac{\partial^2 y}{\partial t^2} = -\dot{M} \frac{\partial^2 y}{\partial x \partial t}, \quad (1)$$

where y satisfies the boundary condition given by equation $$y = \frac{\partial y}{\partial t} = 0 \text{ at } x = \pm \frac{L}{2}, \quad (2)$$

where y is the flexural deflection of the conduit, x is the distance measured from the midsection D following the length of the conduit wherein x is positive between D and G, and negative between D and A, m is the mass of the conduit per unit length, A is the cross sectional area of the flow passage in the conduit, $\rho$ is the density of media in the flow passage, E is the modulus of elasticity of the material of the conduit, I is the moment of inertia of the cross sectional area of the conduit, t is the time, $\dot{M} = A\rho U$ is the mass flow rate of media moving through the conduit, where U is the convective velocity of the media, and L is the length of the conduit between the two secured extremities thereof. The general solution of equation (1) can be expanded into a series of the following form:

$$y = y_1 + \left(\frac{\dot{M}}{EI}\right) y_2 + \left(\frac{\dot{M}}{EI}\right)^2 y_3 + \cdots, \quad (3)$$

where $y_1$ is the primary flexural vibration of the conduit generated by the electromagnetic vibrator, and $y_2$, $y_3$, etc.—are the secondary, tertiary, etc.—flexural vibration resulting from the first, second, etc.—order interactions between the primary flexural vibration and the convective motion of the media in the conduit. Substitution of equation (3) into equation (1) yields the following equation for the secondary flexural vibration $y_2$:

$$\frac{\partial^4 y_2}{\partial x^4} + \frac{m + \rho A}{EI} \frac{\partial^2 y_2}{\partial t^2} = -\frac{\partial^2 y_1}{\partial x \partial t}. \quad (4)$$

The primary vibration $y_1$ satisfying the boundary condition given by equation (2), that is generated by the electromagnetic vibrator disposed at the section B-F, can be represented by equation $$y_1 = y_0 Z\left(\pm \frac{L}{2}\right) \sin \frac{2\pi}{L} x \sin \omega t, \quad (5)$$

where $y_0$ is the amplitude of the primary flexural vibration, $\omega$ is the circular frequency of the natural flexural vibration of the conduit, and $Z(\pm L/2)$ is a function that vanishes at $x=\pm L/2$ and increases to unity as values of x start to deviate from $\pm L/2$. When equation (4) is solved for $y_2$ after substituting $y_1$ given by equation (5) thereinto, $y_2$ satisfying the boundary condition (2) is found in the form:

$$y_2 = y_0 \frac{\frac{2\pi\omega}{L}}{\frac{m+\rho A}{EI}\omega^2 - \left(\frac{2\pi}{L}\right)^4}\left[Z\left(\pm\frac{L}{2}\right)\cos\frac{2\pi}{L}x + Z'\left(\pm\frac{L}{2}\right)\sin\frac{2\pi}{L}x\right]\cos\omega t, \tag{6}$$

where $Z'(\pm L/2)$ is the derivative of $Z(\pm L/2)$ with respective to s. As the specific form of the function $Z(\pm L/2)$ is irrelevant to the final conclusion of the analysis leading to the present invention, solution for $Z(\pm L/2)$ will not be addressed. The natural circular frequency $\omega$ of the flexural vibration of the conduit is of the form $$\omega^2 = K^2 \frac{EI}{m+\rho A}, \tag{7}$$

where K is a coefficient of proportionality. By substituting $\omega$ given by equation (7) into equation (6) and then substituting equations (5) and (6) into equation (3), and taking time derivative of equation (3), the following equation for the flexural vibration velocity v is obtained:

$$v(x,t) = \omega y_0 Z\left(\pm\frac{L}{2}\right)\left\{\sin\frac{2\pi}{L}x\cos\omega t - \frac{2\pi\omega\dot{M}}{LEI\left[K^2-\left(\frac{2\pi}{L}\right)^4\right]}\left[\cos\frac{2\pi}{L}x + \frac{Z'\left(\pm\frac{L}{2}\right)}{Z\left(\pm\frac{L}{2}\right)}\sin\frac{2\pi}{L}x\right]\sin\omega t\right\}. \tag{8}$$

The flexural vibration velocity at the sections C and E, where $Z(\pm L/2)$ is equal to unity and $Z'(\pm L/2)$ vanishes, are given by equation $$v(\pm l,t) = \omega y_0 \left\{\pm\sin\frac{2\pi l}{L}\cos\omega t - \frac{2\pi\omega\dot{M}}{LEI\left[K^2-\left(\frac{2\pi}{L}\right)^4\right]}\cos\frac{2\pi l}{L}\sin\omega t\right\} \tag{9}$$

where $\pm l$ are values of x—coordinate at the sections C and E, respectively.

It can be readily shown from equation (9) that $$v(+l,t) = -4\omega y_0 \frac{\pi\omega\dot{M}}{LEI\left[K^2-\left(\frac{2\pi}{L}\right)^4\right]}\cos\frac{2\pi l}{L}\sin\omega t_1, \tag{10}$$

when $v(-l,t)=0$ at $t=t_1$, and $$v(+l,t) = -2\omega y_0 \sin\frac{2\pi l}{L}\sin\omega t_1, \tag{11}$$

when $v(-l,t)$ reaches peak value at $t = t_1 + \frac{\pi}{2\omega}$.

Taking ratio between equations (10) and (11) yields equation $$\dot{M} = \frac{LEI\left[K^2-\left(\frac{2\pi}{L}\right)^4\right]}{2\pi\omega}\tan\frac{2\pi l}{L}\frac{v(+l,t)|_{v(-l,t)=0}}{v(+l,t)|_{v(-l,t)=PEAK}}. \tag{12}$$

The motion sensor generates electromotive force E proportional to the flexural vibration velocity v, which relationship can be written in the form $$E(\pm l,t) = \lambda(\pm l)v(\pm l,t), \tag{13}$$

where $\lambda$ is the amplification factor of the motion sensor, which may have different values for the two motion sensors respectively disposed at the two sections C and E due to uneven drift in the electronics. When use of equation (13) is made, equation (12) can be written in the form $$\dot{M} = H\frac{E(+l,t)|_{E(-l,t)=0}}{E(+l,t)|_{E(-l,t)=PEAK}}, \tag{14}$$

where H is a coefficient of proportionality. It can be readily shown that $+l$ and $-l$ in equation (14) can be interchanged. In conclusion, it has been shown that by using an empirically obtained mathematical relationship equivalent to equation (14), the mass flow rate of the media can be determined as a function of ratio between a first detected value of the flexural vibration generated by a first motion sensor measuring the flexural vibration of the conduit at a first section of the conduit at an instant when the detected value of the flexural vibration generated by a second motion sensor measuring the flexural vibration of the conduit at a second section of the conduit vanishes, and a second detected value of the flexural vibration generated by the first motion sensor at another instant when the detected value of the flexural vibration generated by the second motion sensor reaches a peak value during at least one half cycle of the flexural vibration of the conduit. It can be shown theoretically as well as empirically that the two motion sensors can be respectively disposed on any two sections of the conduit including the two symmetrically located sections about the midsection of the conduit as shown in the particular illustrative embodiments. In practicing the above-described method for measuring the mass flow rate, it is preferred that the mass flow rate is determined in two different combinations in an alternating manner, wherein first combination determines the mass flow rate from the ratio of two values of the flexural vibration measured by the first motion sensor by using the second motion sensor for triggering the measurement, and the second combination determines the mass flow rate from the ratio of two values of the flexural sensor for triggering the measurement. The two values of the mass flow rates determined by the above-described two different modes can be averaged to obtain the actual measured value of the mass flow rate, or they can be compared to one another for consistancy as a measure of proper operation of the mass flowmeter.

When the use of equation (13) is made, the following equation can be obtained from equation (9):

$$\frac{AMP[E(-l,t) + \eta E(+l,t)]}{AMP[E(-l,t) - \eta E(+l,t)]} = \frac{2\pi\omega\dot{M}}{LEI\left[K^2\left(\frac{2\pi}{L}\right)^4\right]} \cot\frac{2\pi l}{L}, \quad (15)$$

and AMP[ ] stands for the amplitude or peak value of the variable contained in the bracket. Equation (15) can be written in the form $$\dot{M} = H\frac{AMP[E(-l,t) + \eta E(+l,t)]}{AMP[E(-l,t) - \eta E(+l,t)]}, \quad (17)$$

where H is a coefficient of proportionality. The value of $\eta$ given by equation (16) can be determined by equation $$\eta = \frac{AMP[E(-l,t)]}{AMP[E(+l,t)]}, \quad (18)$$

which relationship follows from the fact that AMP[v(−l,t)]=AMP[v(+l,t)] for two symmetrically disposed motion sensors about the midsection of the conduit and equation (13). It is concluded from equation (17) that, by using an empirically obtained mathematical relationship equivalent to equation (17), the mass flow rate of the media can be determined as a function of the ratio between the amplitude of an additive combination of two electrical signals respectively generated by two motion sensors symmetrically disposed about the midsection of the conduit, and the amplitude of a differential combination of the same two electrical signals. It should be noticed that the mass flow rate of the media determined by either of the two methods respectively defined by equations (14) and (17) or their empirical equivalents is independent of the amplification factors of the motion sensors and, consequently, both methods measure the mass flow rate accurately independent of the drift in the amplification factors of the transducers or that of the electronic circuits.

Figure 8:
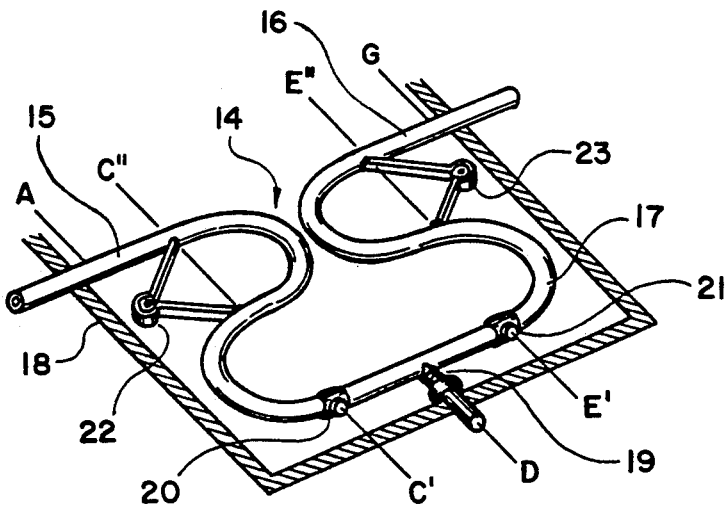
FIG. 8 illustrates a perspective view of an embodiment of the convective inertia force flowmeter employing a single conduit under flexural vibration of a symmetric mode about the midsection of the conduit.

In FIG. 8 there is illustrated a perspective view of the convective inertia force flowmeter invented by Hyok S. Lew, that employs a single conduit 14 comprising two generally straight end sections 15 and 16 disposed in an in-line relationship therebetween and connected to one another by an omega-shaped midsection 17. The two extremities A and G of the conduit 14 are secured to a support structure 18. An electromagnetic vibrator 19 exerting a vibratory force at the midsection D of the conduit 14 generates a flexural vibration of the conduit 14 of a symmetric mode about the midsection thereof in directions generally parallel to a plane including the omega-shaped midsection 17 of the conduit. Either the first pair of motion sensors 20 and 21 respectively located on the sections C' and E', or the second pair of motion sensors 22 and 23 located on the sections C" and E" measure the flexural vibration of the conduit at two opposite halves thereof. The motion sensors 20 and 21 can be accelerometer type, while the motion sensors 22 and 23 are piezo electric type employing a cylindrical shell piezo electric element confined in a slitted cylindrical cavity that tightens and loosens the cylindrical shell piezo electric element as the two legs extending therefrom and respectively connected to two members experiencing a relative vibratory motion therebetween opens and closes. It is readily realized that a pair of the conduits having a configuration similar to that shown in FIG. 8 can be disposed on a common plane in a symmetric arrangement about a plane therebetween to construct a modified version of the embodiment shown in FIG. 8 equivalent to that shown in FIG. 11.

Figure 9:
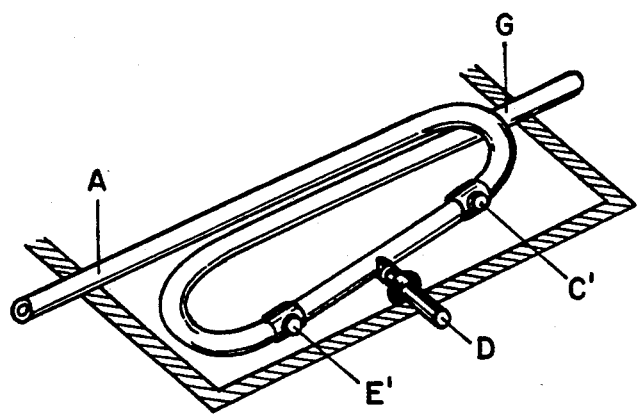
FIG. 9 illustrates another embodiment of the convective inertia force flowmeter employing a single conduit under flexural vibration of a symmetric mode about the midsection of the conduit.
Figure 10:
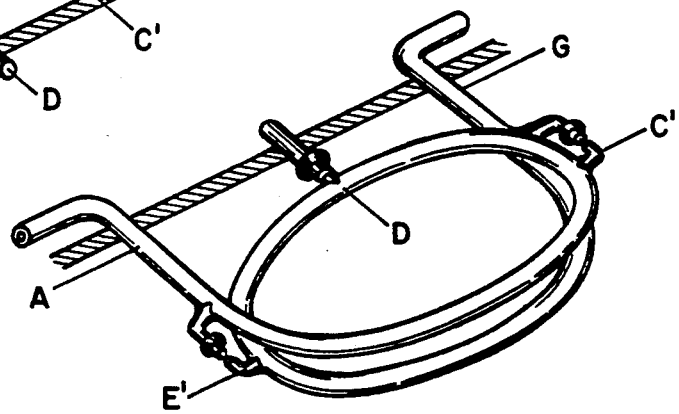
FIG. 10 illustrates a further embodiment of the convective inertia force flowmeter employing a single conduit under flexural vibration of a symmetric mode about the midsection of the conduit.

In FIGS. 9 and 10, there are illustrated other embodiments of the convective inertia force flowmeter invented by Hyok S. Lew, which employ a conduit with two end sections connected by a looped midsection, wherein an electromagnetic vibrator vibrates the conduit in a symmetric mode about the midsection D in directions parallel to a plane generally including the looped midsection of the conduit. The alphabetical symbolisms stand for the same symbolism as those explained in conjunction with FIG. 8.

Figure 11:
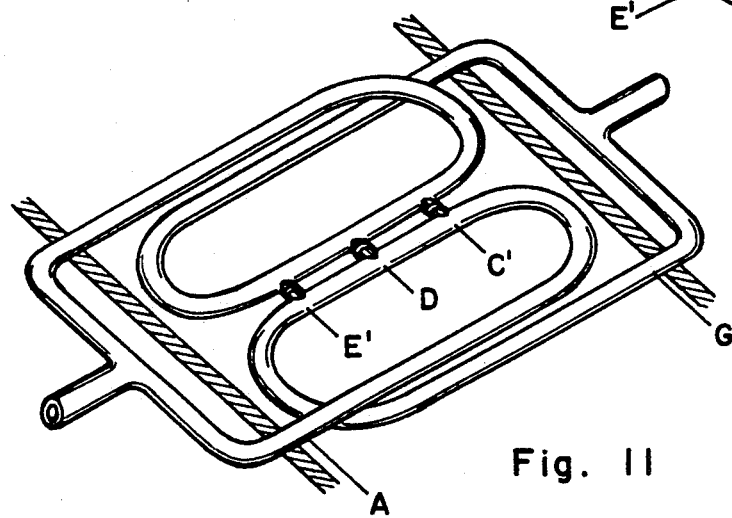
FIG. 11 illustrates yet another embodiment of the convective inertia force flowmeter, that is a modified version of the embodiment shown in FIG. 9 or 10.

In FIG. 11 there is illustrated still other embodiment of the convective inertia force flowmeter that is a modified version of the embodiment shown in FIG. 9, wherein a pair of conduits disposed substantially on a common plane in a symmetric arrangement about a plane therebetween are vibrated relative to one another by an electromagnetic vibrator disposed at a plane including the midsections of the two conduits in directions parallel to the common plane including the two conduits. It is readily realized that a further embodiment of the convective inertia force flowmeter equivalent to that shown in FIG. 11 can be constructed by employing a pair of conduits such as that employed in the embodiment shown in FIG. 10.

Figure 12:
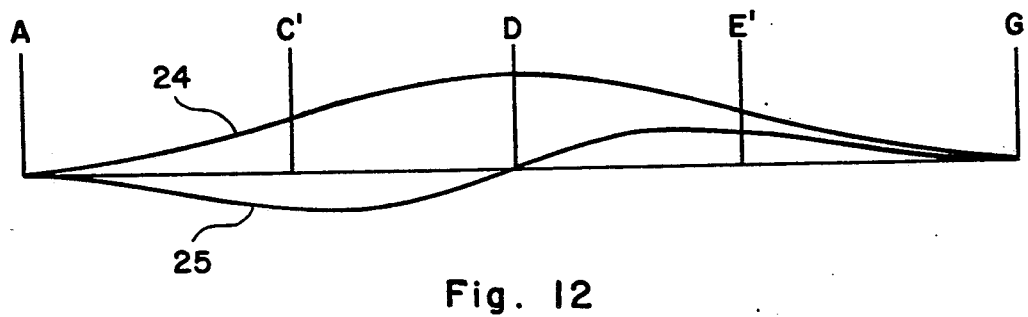
FIG. 12 illustrates distributions of the symmetric primary flexural vibration generated by an electromagnetic vibrator, and an antisymmetric secondary flexural vibration generated by media moving through the conduit as a dynamic reaction to the symmetric primary flexural vibration, which combination of the flexural vibrations takes place with the conduit or conduits employed in the embodiments shown in FIGS. 8 through 11.
Figure 13:
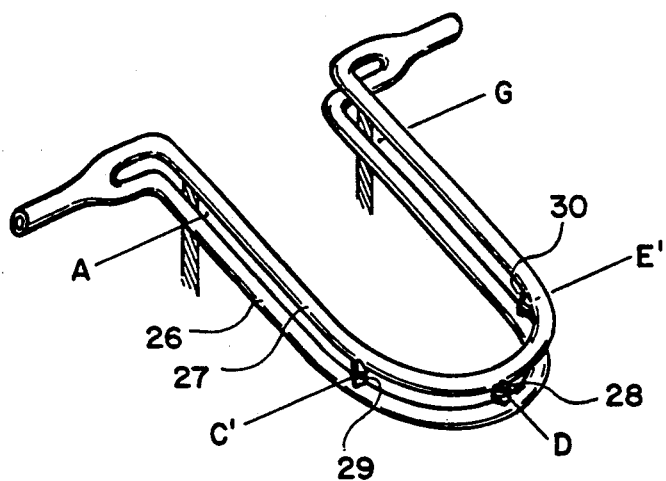
FIG. 13 illustrates a perspective view of an embodiment of the existing Coriolis force flowmeter.
Figure 14:
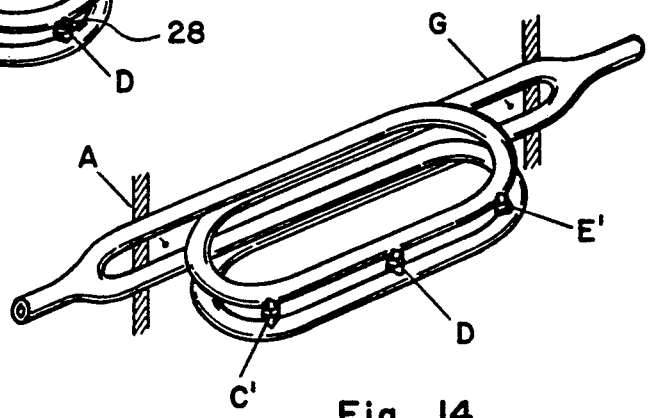
FIG. 14 illustrates another embodiment of the existing Coriolis force flowmeter.
Figure 15:
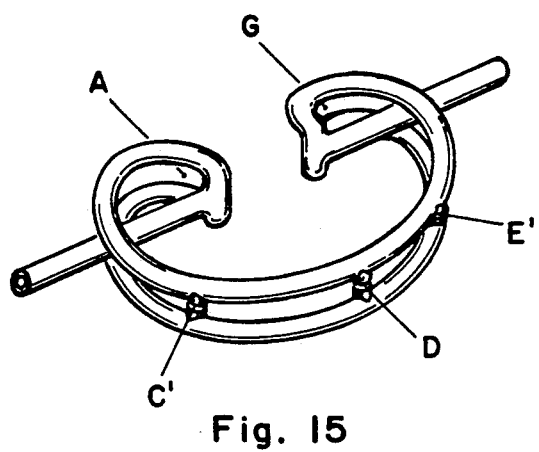
FIG. 15 illustrates a further embodiment of the existing Coriolis force flowmeter.
Figure 16:
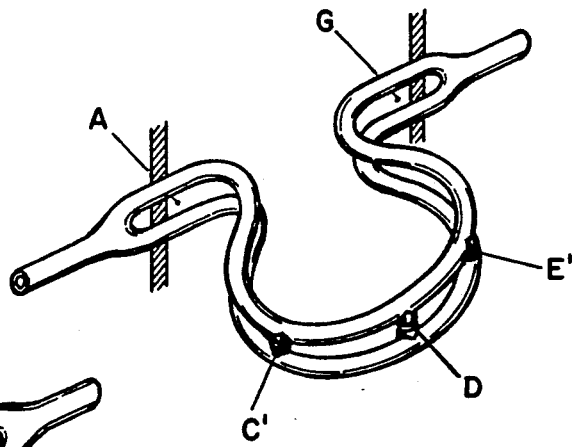
FIG. 16 illustrates yet another embodiment of the existing Coriolis force flowmeter.
Figure 17:
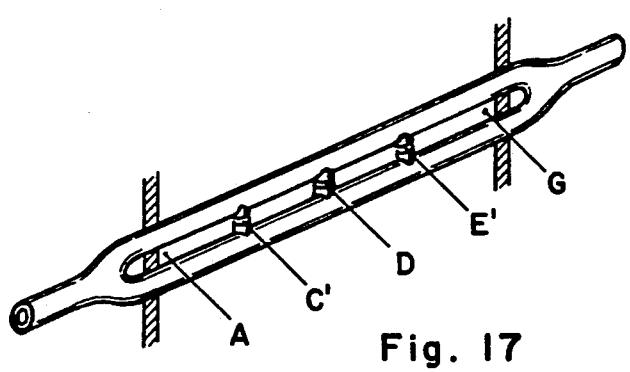
FIG. 17 illustrates yet a further embodiment of the existing Coriolis force flowmeter.

In FIG. 12 there is illustrated distributions of the symmetric primary flexural vibration generated by the electromagnetic vibrator, and the antisymmetric secondary flexural vibration generated by the convective inertia force of the media moving through the conduit, which combination of the flexural vibrations takes place with the conduit included in the embodiments of the mass flowmeter shown in FIGS. 8 through 11. The symmetric primary flexural vibration with distribution given by the curve 24 represents the first term on the right hand side of equation (8) wherein sin (2π/L)x is now replaced with cos (2π/L)x, while the antisymmetric secondary flexural vibration with distribution given by the curve 25 represents the second term thereof wherein sin (2π/L)x is now replaced with −cos (2π/L)x. The equation (14) defining the first method for measuring the mass flow rate remains unchanged for the mass flowmeter employing one or a pair of conduits under the combination of the symmetric primary and antisymmetric secondary flexural vibrations. The equation (17) defining the second method changes to the following form:

$$\dot{M} = H\frac{AMP[E(-l,t) - \eta E(+l,t)]}{AMP[E(-l,t) + \eta E(+l,t)]}$$

where definition of $\eta$ given by equation (18) remains unchanged.

In FIGS. 13, 14, 15, 16 and 17, there are illustrated various existing versions of the Coriolis force flowmeter employing a pair of curved or straight conduits 26 and 27 disposed in a parallel arrangement and vibrated relative to one another by an electromagnetic vibrator 28 disposed at a plane including the midsections of the two conduits. In the existing method being practiced with the existing versions of the Coriolis force flowmeters, the mass flow rate is determined as a function of the phase angle different in the flexural vibration between two flexural vibration motions respectively measured by two motions sensors 29 and 30 located on the sections C' and E'. As the flexural vibration of the individual conduits included in these embodiments is also represented by the curves 24 and 25 shown in FIG. 12, the two methods for measuring the mass flow rate respectively defined by equations (14) and (17) or their empirical equivalents can be practiced with the embodiments shown in FIGS. 13 through 17 as well as an embodiment wherein a pair of S-shaped conduits are disposed in a parallel arrangement into an assembly similar to the embodiment shown in FIG. 17.

While the principles of the present invention have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described, and accordingly, all suitable modifications and equivalents may be regarded as falling within the scope of the invention as defined by the claims which follow.

The embodiments of the invention, in which an exclusive property or privilege is claimed, are defined as follows:

1. A method for measuring mass flow rate of media moving through a conduit with two extremities restrained from experiencing lateral displacement, comprising in combination:
    a) generating a primary flexural vibration of the conduit in one of a symmetric and an antisymmetric mode with respect to a midsection of the conduit by exerting a force laterally thereto, said primary flexural vibration of the conduit creating a secondary flexural vibration of the conduit out of phase relative to the primary flexural vibration of the conduit as a result of dynamic interaction between the primary flexural vibration of the conduit and motion of media moving through the conduit;
    b) detecting resultant flexural vibration of the conduit at a first section thereof by using a first motion sensor providing a first alternating electrical signal generated by the resultant flexural vibration of the conduit at said first section thereof, and resultant flexural vibration of the conduit at a second section thereof by using a second motion sensor providing a second alternating electrical signal generated by the resultant flexural vibration of the conduit at said second section thereof;
    c) taking a first numerical value of said first alternating electrical signal at an instant when numerical value of said second alternating electrical signal is equal to zero;
    d) taking a second numerical value of said first alternating electrical signal at another instant when numerical value of said second alternating signal reaches a peak value; and
    e) determining mass flow rate of media moving through the conduit as a function of ratio between said first and second numerical values of the first alternating electrical signal.

2. A method as defined in claim 1 wherein said first and second motion sensors are disposed symmetrically about the midsection of the conduit.

3. A method as defined in claim 1 wherein said method comprises taking a first numerical value of said second alternating electrical signal at an instant when numerical value of said first alternating electrical signal is equal to zero and taking a second numerical value of said second alternating electrical signal at another instant when numerical value of said first alternating electrical signal reaches a peak value, and determining mass flow rate of the media moving through the conduit as a function of ratio between said first and second numerical values of the second alternating electrical signal.

4. A method as defined in claim 3 wherein final value of the mass flow rate of the media moving through the conduit is obtained by taking an averaged value between the two mass flow rates respectively determined by said two methods.

5. A method as defined in claim 3 wherein the two mass flow rates respectively determined by said two methods are compared to one another for consistency as a measure of proper operation of the method.

* * * * *